United States Patent
Chang et al.

(10) Patent No.: US 7,155,005 B2
(45) Date of Patent: Dec. 26, 2006

(54) APPARATUS FOR RING-BACK CONSTRICTION

(75) Inventors: Chi Chang, Shindian (TW); Chin-Hsien Yen, Shindian (TW)

(73) Assignee: Via Technologies, Inc., Taipei (TW)

( * ) Notice: Subject to any disclaimer, the term of this patent is extended or adjusted under 35 U.S.C. 154(b) by 559 days.

(21) Appl. No.: 10/091,451

(22) Filed: Mar. 7, 2002

(65) Prior Publication Data
US 2002/0126831 A1    Sep. 12, 2002

(30) Foreign Application Priority Data
Mar. 8, 2001   (TW) ............................. 90105470 A

(51) Int. Cl.
    *H03K 17/16*   (2006.01)
(52) U.S. Cl. ............................. 379/387.01; 326/30
(58) Field of Classification Search .............. 326/30, 326/85, 87; 327/309, 310, 312; 375/257, 375/377; 379/387.01
See application file for complete search history.

(56) References Cited

U.S. PATENT DOCUMENTS 6,275,088 B1 *   8/2001   Jain ............................. 327/312
6,326,803 B1 *  12/2001   Takeda ........................ 326/30

OTHER PUBLICATIONS

Sedra et al., Microelectronic Circuits, 1998, Oxford University Press, Fourth Edition, pp. 1049-1052.*

\* cited by examiner

Primary Examiner—Sinh Tran
Assistant Examiner—Walter F Briney, III
(74) Attorney, Agent, or Firm—Rabin & Berdo, P.C.

(57) ABSTRACT

An apparatus for ring-back constriction is provided. The apparatus includes a comparator, a termination controller, a termination variable resistor, a constriction controller, and a constriction variable resistor. The comparator is coupled to the transmission line, for comparing the line signal with a reference voltage, and accordingly outputting a comparison signal. The termination controller is coupled to the comparator, for outputting a termination control signal to adjust the resistance of the termination variable resistor. The constriction controller is coupled to the comparator for outputting a constriction signal to adjust the resistance of the constriction variable resistor. The ring-back effect is constricted due to impedance matchtermination voltage when an undershot occurs.

17 Claims, 6 Drawing Sheets

APPARATUS FOR RING-BACK CONSTRICTION

This application incorporates by reference Taiwanese application Ser. No. 90105470, filed Mar. 8, 2001.

BACKGROUND OF THE INVENTION

1. Field of the Invention

The invention relates in general to an apparatus for the ring-back constriction, and more particularly to an apparatus for the ring-back constriction for a high-frequency low-swing transmission bus.

2. Description of the Related Art

Computers today run at a much higher clock frequency, and thus consume more power. The high-frequency low-swing transmission bus in the computer becomes popular because the computer is faster and more power save. Gunning Transceiver Logic Plus (GTL+) bus is one of the high-frequency low-swing transmission buses. In a computer, GTL+ buses are used between CPU and the north bridge chipset as transmission buses. A GTL+ bus includes one transmission line with two termination resistors to a termination voltage of high level. If the impedance of the transmission line does not match with the termination resistor, a reflection occurs in the bus. A reflective wave superimposes with the original signal and accordingly affects the wave shape of the signal. This phenomenon is known as a ring-back effect. The termination resistor reduces the ring-back effect and pulls high the voltage of the bus for stabilizing the signal.

The comparator compares the signal on the transmission line with a reference voltage and accordingly outputs a comparison signal. When the line signal is lower in magnitude than the reference voltage, the line signal is determined as low, and the comparator outputs a low-level comparison signal. When the line signal is higher in magnitude than the reference voltage, the line signal is determined as high, and the comparator outputs a high-level comparison signal. Accordingly, the correctness of the line signal received is ensured. However, if the output node of the transmission line is positioned at the end of the transmission line, a termination resistor is required to match the impedance of the transmission line. The termination resistor constricts the ring-back effect and can pull high the voltage of the transmission line.

FIG. 1 is a diagram of a well-known apparatus for the ring-back constriction. The apparatus includes a termination resistor R and a comparator 102. The comparator 102 receives the signal Vi on the transmission line L of a GTL+ bus. The comparator 102 compares the line signal Vi with a reference voltage Vref and outputs a comparison signal Vc. The comparison signal Vc determines the line signal Vi to be at either high or low level. In the figure, the voltage Vtt is the termination voltage of the GTL+ bus. Generally, the voltage Vtt is 1.5 volt, and the reference voltage is 1 volt.

When the line signal Vi is high, the voltage difference between the two ends of the termination resistor R is almost zero, and thus the termination resistor R consumed almost no power. When the line signal Vi transits from high to low, the ring-back effect can be constricted due to the impedance match between the termination resistor end and the transmission line L. However, a current flows through the termination resistor R when the line signal Vi is low, and the power consumption increases. In addition, each transmission line of the GTL+ bus needs termination resistors outside the chipset and thus the cost is increased.

FIG. 2 is another well-known apparatus for the ring-back constriction. The apparatus uses variable resistors as termination resistors. The advantage is that the power consumption is reduced. That is because when the line signal is low, the resistance of the variable resistor is turned to extremely high. The apparatus includes a termination controller 202, a termination variable resistor Rt, and a comparator 203. When the line signal Vi is high, the resistance of the termination variable resistor Rt becomes low according to the termination control signal St generated by the termination controller 202. The ring-back effect is thus constricted due to the impedance match. The signal on the transmission line L is also stabilized because the voltage of the transmission line L is pulled high by the voltage Vtt through the termination variable resistor Rt. In addition, almost no power is consumed at the termination variable resistor Rt because the voltage difference at the two ends of the termination variable resistor Rt is almost zero. When the line signal Vi is low, the resistance of the termination variable resistor Rt becomes high according to the termination control signal St generated by the termination controller 202. Also, almost no power is consumed at the termination variable resistor Rt because the resistance of the termination variable resistor Rt is high. The termination variable resistor Rt is implemented by a transistor, and the apparatus is included in the chipset.

However, in this prior art, the impedance match is not good enough if the termination variable resistor Rt does not have a good linear I-V curve. The line signal Vi undershoot and accordingly a ring-back occurs. Detailed description about the effects of the ring-back constriction using fixed resistors (as in FIG. 1) and variable resistors (as in FIG. 2) will be discussed in the following paragraph.

FIG. 3A is the transition diagram of the line signal Vi stated in FIG. 1. As shown, when the line signal Vi transits, the ring-back effect can be efficiently constricted. In the figure, the bit time tb is the time needed to transfer a bit. FIG. 3B is the transition diagram of the line signal Vi stated in FIG. 2. The ring-back constriction is not as good as that shown in FIG. 3A because the termination variable resistor Rt is implemented by a transistor in integrated circuits; while the resistor shown in FIG. 1 is a common resistor. The node A is an undershooting point, and the node B is a ring-back point. If the voltage difference between the ring-back value at node B and the reference voltage Vref is less than 0.2 volt, the reading of the line signal will possibly be wrong. When the working frequency of the GTL+ bus is 100 MHz, the apparatus shown in FIG. 2 can work normally without errors. However, when the working clock frequency of the GTL+ bus is higher, such as 133 MHz, ring-back effects become more obvious and thus reading errors occur.

SUMMARY OF THE INVENTION

It is therefore an object of the invention to provide an apparatus for better ring-back constriction.

The invention achieves the above-identified objects by providing a new apparatus for the ring-back constriction. The apparatus couples to a transmission line, for constricting the ring-back effect. The apparatus includes a comparator, a termination controller, a termination variable resistor, a constriction controller, and a constriction variable resistor. The comparator couples to the transmission line, for comparing the line signal with a reference voltage, and accordingly outputting a comparison signal. The termination controller couples to the comparator, for outputting a termination control signal according to the comparison signal. The termination variable resistor couples to a termination voltage and the transmission line, and the resistance of the termination variable resistor is adjusted according to the termination control signal. The constriction controller couples to the comparator for outputting a constriction signal. The constriction variable resistor couples to a constriction voltage and the transmission line, and the resistance of the constriction variable resistor is adjusted according to the constriction signal for providing a constriction voltage to the transmission line.

BRIEF DESCRIPTION OF THE DRAWINGS

Other objects, features, and advantages of the invention will become apparent from the following detailed description of the preferred but non-limiting embodiments. The description is made with reference to the accompanying drawings, in which.

DESCRIPTION OF THE PREFERRED EMBODIMENT

The apparatus of ring-back constriction of this invention is used in a high-frequency low-swing bus, such as a GTL+ bus. In the following embodiment, the GTL+ bus is used as an example of the high-frequency low-swing bus to illustrate the invention in detail.

Figure 1:
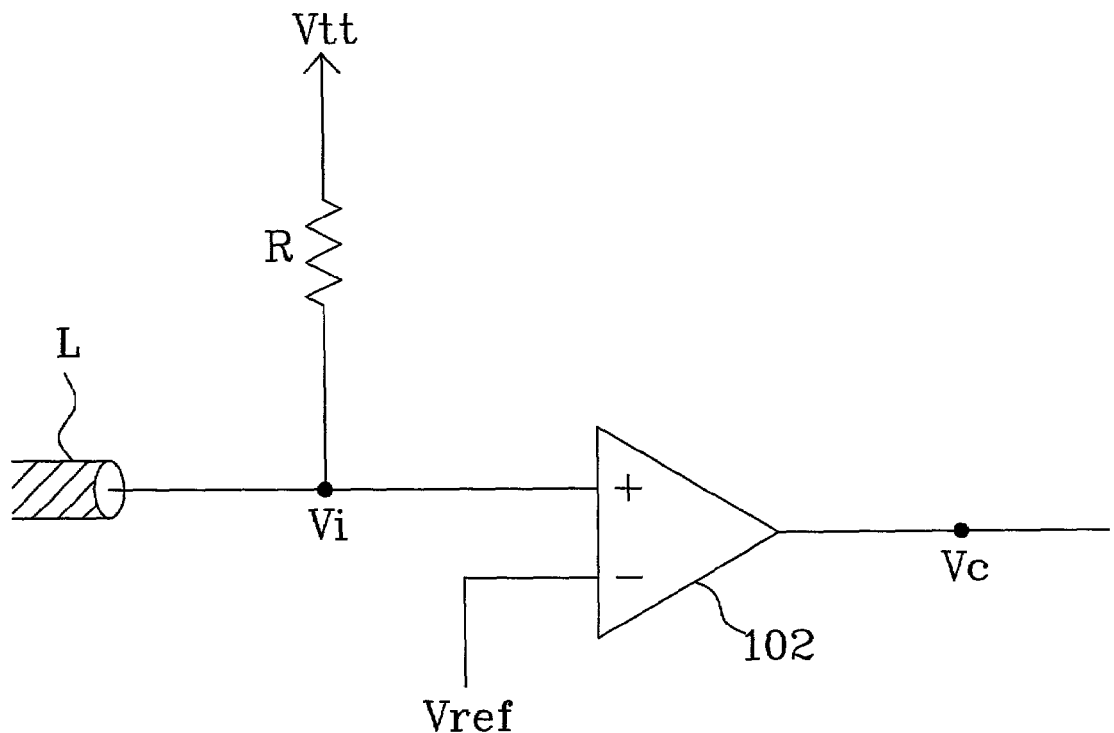
FIG. 1 is a diagram of a well-known apparatus for the ring-back constriction.
Figure 2:
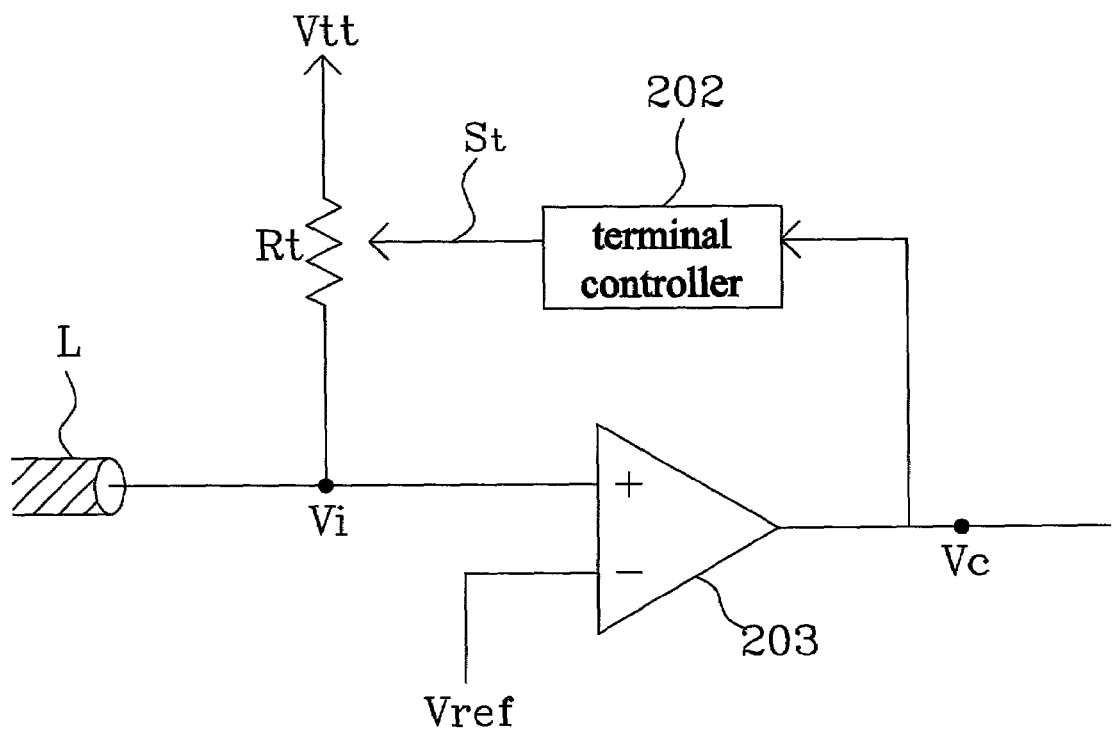
FIG. 2 is another well-known apparatus for the ring-back constriction.
Figure 3A:
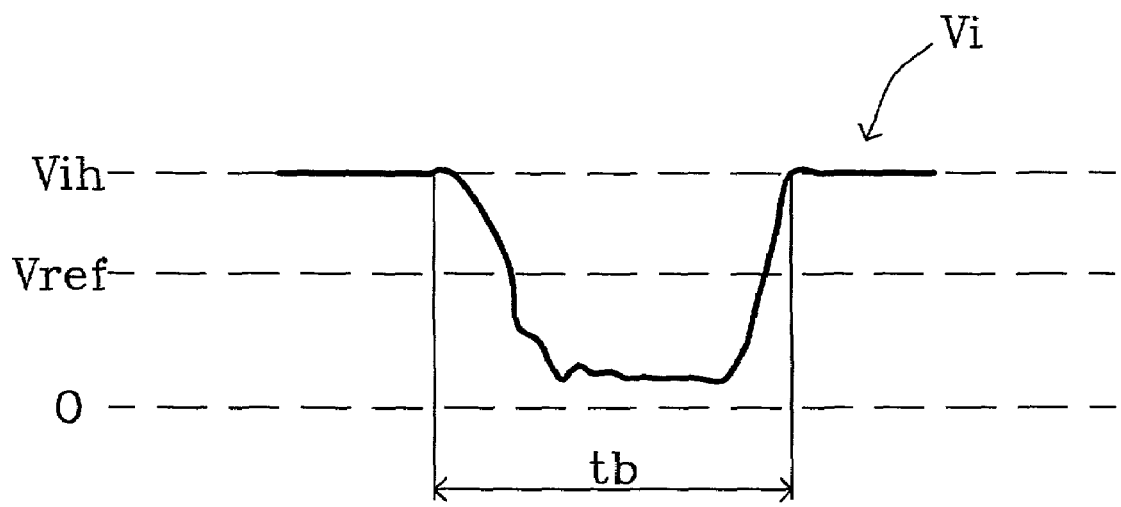
FIG. 3A is the transition diagram of the line signal Vi stated in FIG. 1.
Figure 3B:
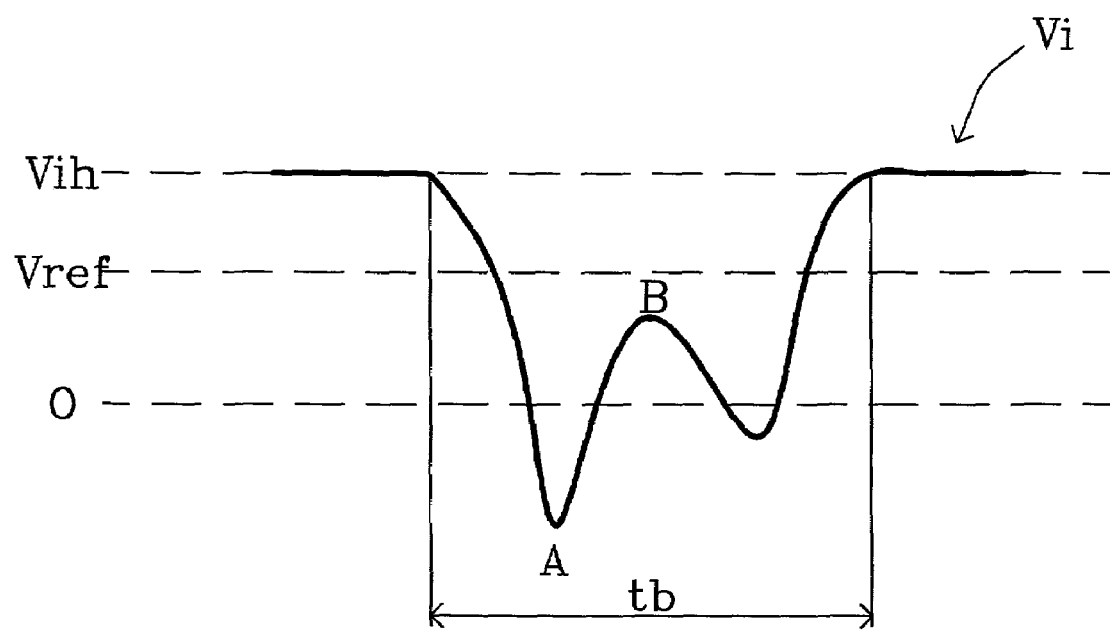
FIG. 3B is the transition diagram of the line signal stated in FIG. 2.
Figure 4:
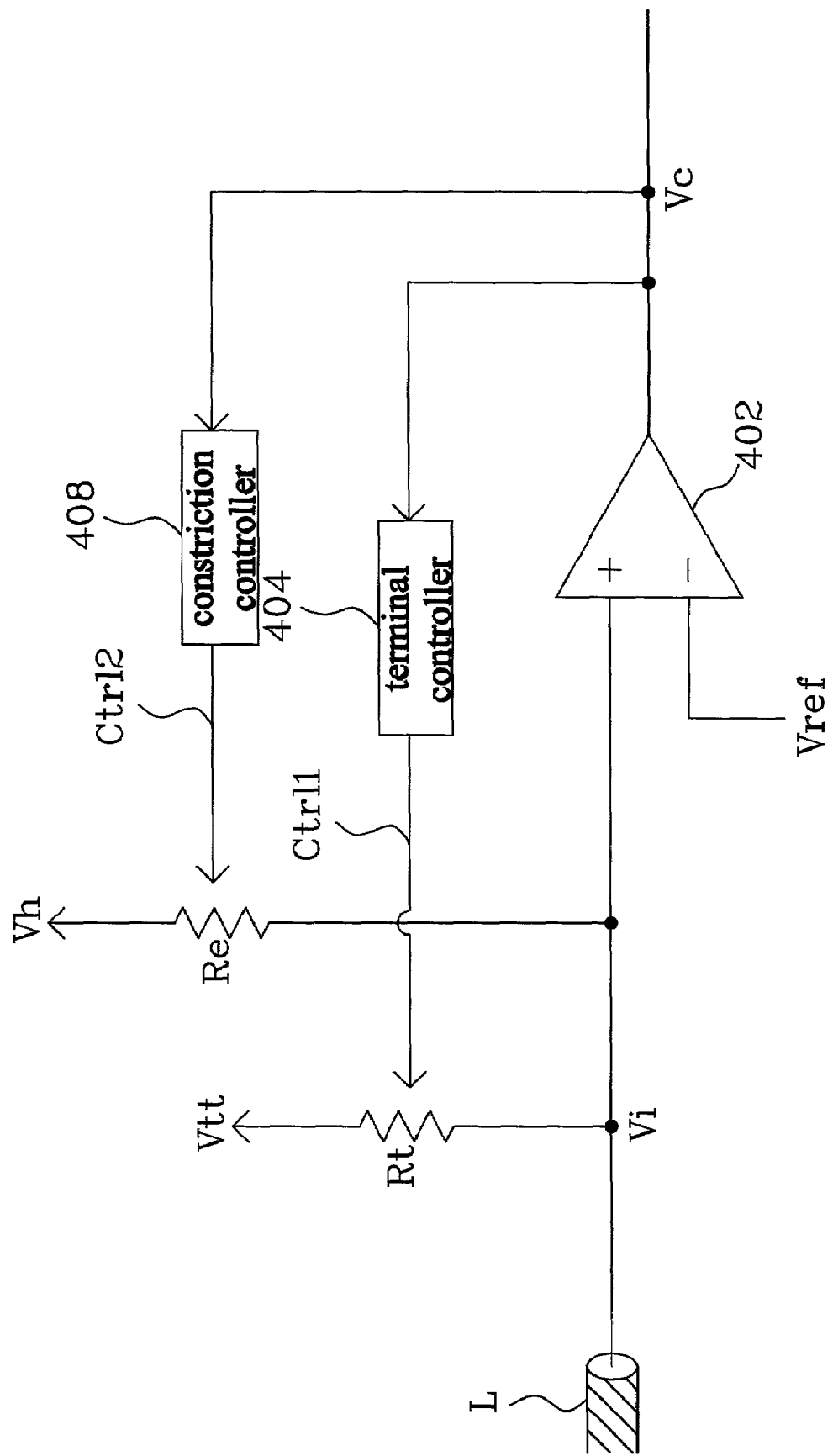
FIG. 4 is a preferred embodiment of an apparatus for the ring-back constriction according to this invention.

FIG. 4 is a preferred embodiment of an apparatus for the ring-back constriction according to this invention. The apparatus is coupled to a transmission line of the GTL+ bus, for constricting the ring-back effect of the line signal Vi. The apparatus includes a comparator 402, a termination variable resistor Rt, a termination controller 404, a constriction variable resistor Re, and a constriction controller 408. When the line signal Vi transits from the high level to the low level, the comparator 402 outputs a comparison signal Vc to the termination controller 404. Accordingly the termination controller 404 outputs a termination control signal Ctrl1 to adjust the resistance of the termination variable resistor Rt to a high value. The high-value resistance of the termination variable resistor Rt blocks a current passing through the resistor Rt, which has been described above in detail. Note that when the line signal Vi transits from the high level to the low level, the line signal Vi has an undershoot because the impedance between the resistor Rt and the transmission line L does not match. The undershot of the line signal Vi then causes a ring-back. In order to constrict the ring-back, the invention uses a higher voltage to pull the voltage of the transmission line L higher when the undershot occurs, and then the ring-back can be constricted.

In the invention, one end of the constriction variable resistor Re is coupled to a constriction voltage Vh, and the other end of the constriction variable resistor Re is coupled to the transmission line L. The resistance of the resistor Re is determined according to the constriction control signal Ctrl2. The constriction controller 408 couples to the comparator 402 and the constriction variable resistor Re for outputting the constriction control signal Ctrl2. Generally, the reference voltage is 1 volt, the terminal voltage is 1.5 volt, the constriction voltage Vh is higher than the terminal voltage Vtt, and the constriction voltage Vh is about 2.5 or 2.6 volt.

Figure 5:
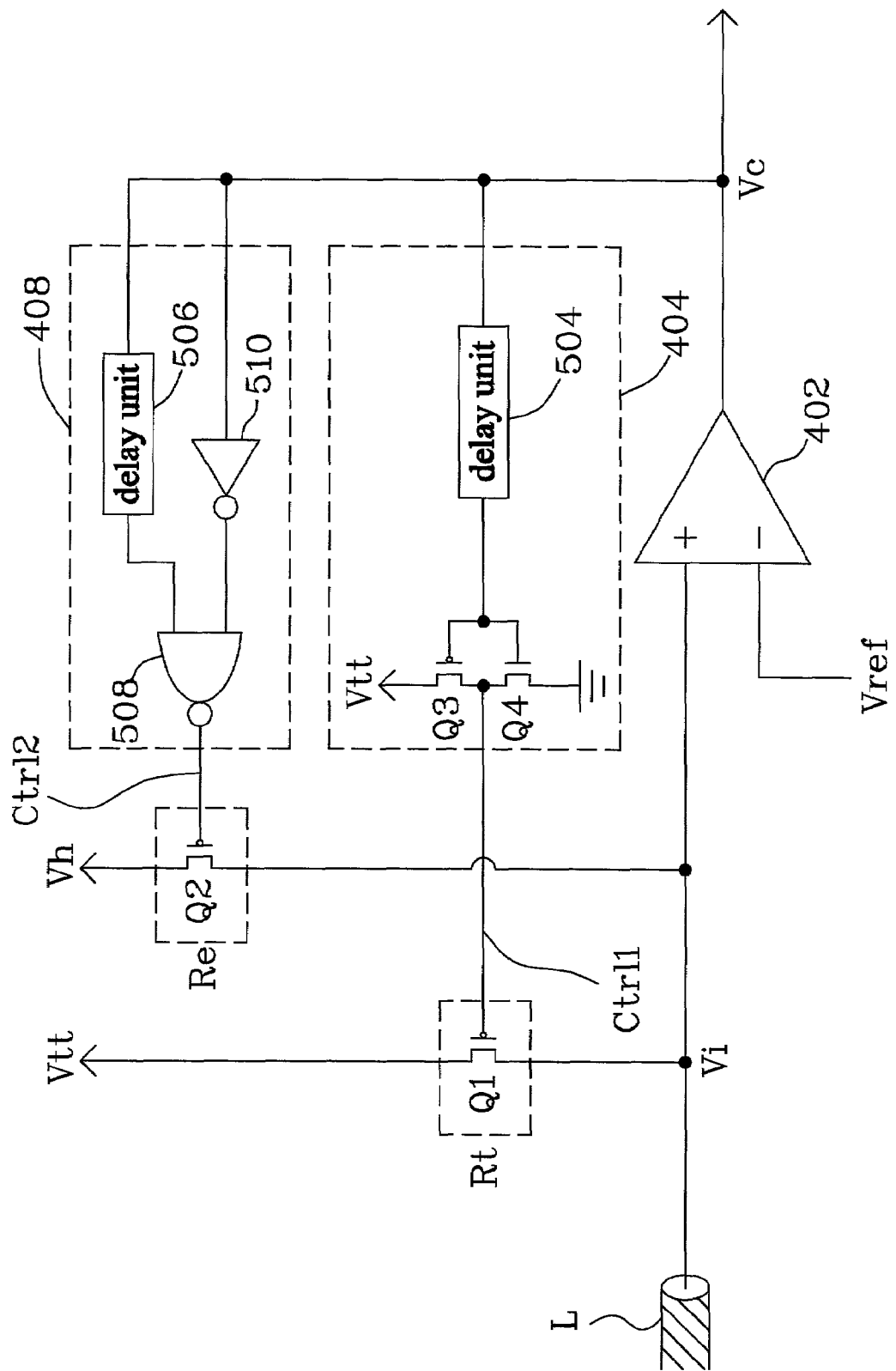
FIG. 5 is an example of the embodiment shown in FIG. 4.

FIG. 5 is an example of the embodiment shown in FIG. 4. The termination variable resistor Rt includes a PMOS transistor Q1. When the termination control signal Ctrl1 is high, the transistor Q1 is off; when the termination control signal Ctrl1 drops from the high level, the resistance of the transistor Q1 is accordingly smaller. The constriction variable resistor Re includes a PMOS transistor Q2. When the constriction control signal Ctrl2 is high, the transistor Q2 is off; when the constriction control signal Ctrl2 drops from the high level, the resistance of the transistor Q2 is accordingly smaller. The termination controller 404 includes a PMOS transistor Q3, a NMOS transistor Q4, and a delay unit 504. The PMOS transistor Q3 and the NMOS transistor Q4 together are used as an inverter. The delay unit 504 delays the comparison signal Vc for a delay period t1, and then outputs the delayed comparison signal Vc to the inverter of the termination controller 404. Then the inverter outputs the termination control signal Ctrl1 to the termination variable resistor Rt. The constriction controller includes a NAND gate 508, an inverter 510, and a delay unit 506. The delay unit 506 delays the comparison signal Vc for a delay period t1. The inverter 510 inverts the comparison signal Vc. The NAND gate 508 receives the delayed comparison signal and the inverted comparison signal and accordingly generates a pulse. In the delay period t1, the pulse is high, and accordingly the resistance of the constriction variable resistor Re is low; after the delay period t1, the pulse is low, and accordingly the resistance of the constriction variable resistor Re is high. The PMOS transistor Q3 is a weak transistor such that a transition period t2 is needed for the transistor Q3 to change the resistance of the termination variable resistor Rt from the low value to the high value. The NAND gate 508 includes a weak PMOS transistor, the weak PMOS transistor needs a transition period t3 to change the resistance of the constriction variable resistor Re from the low value to the high value. These weak transistors prevent radical changes of the resistance, while radical changes may induce more reflections.

Figure 6:
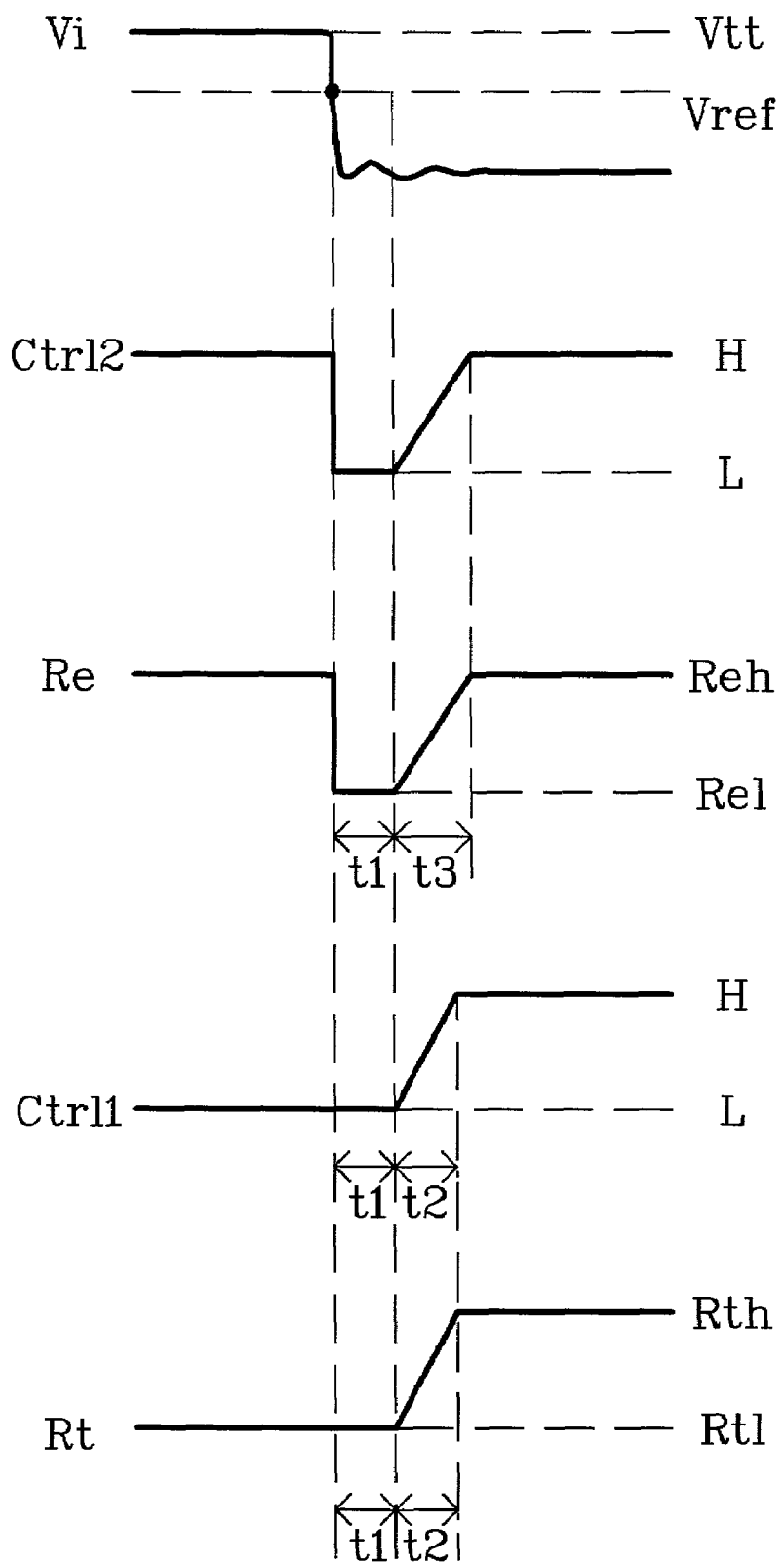
FIG. 6 is the wave diagram of the line signal.

FIG. 6 is the wave diagram of the line signal Vi, the constriction control signal Ctrl2, the resistance of the constriction variable resistor Re, the termination control signal Ctrl1, and the resistance of the termination variable resistor Rt. When the line signal Vi is high, the resistance of the constriction variable Re is of a high value Reh, and the resistance of the termination resistor Rt is of a low value Rtl. When the line signal Vi transits from the high level to the low level, the constriction controller 408 outputs the constriction control signal Ctrl2 in order to change the resistance of the constriction variable resistor Re to the low value, and the transistor Q2 of the constriction variable resistor Re and the transistor Q1 of the termination variable resistor Rt are turned on during period t1. Because the constriction voltage Vh is larger than the termination voltage Vtt, the turn-on of the transistor Q2 of the constriction variable resistor Re pulls the transmission line L to reduce the undershot and thus constricts the ring-back effect. After the delay period t1, the constriction control ends.

When the constriction control is ended, the resistance of the constriction variable resistor Re and the resistance of the termination variable resistor Rt should be slowly increased to avoid inducing reflective waves due to the dramatic change of the resistances. First, the voltage level of the constriction control signal Ctrl2 raises and accordingly the resistance of the constriction variable resistor Re increases. The voltage level of the termination control signal Ctrl1 also rises and accordingly the resistance of the termination variable resistor Rt increases. After a transition period t2, the voltage level of the termination control signal Ctrl1 rises to the high level H to save power consumption. It takes a transition period t3 to raise the voltage level of the constriction voltage level to the high level, and accordingly the resistance of the constriction variable resistor Re increases to the high value Reh.

Figure 7:
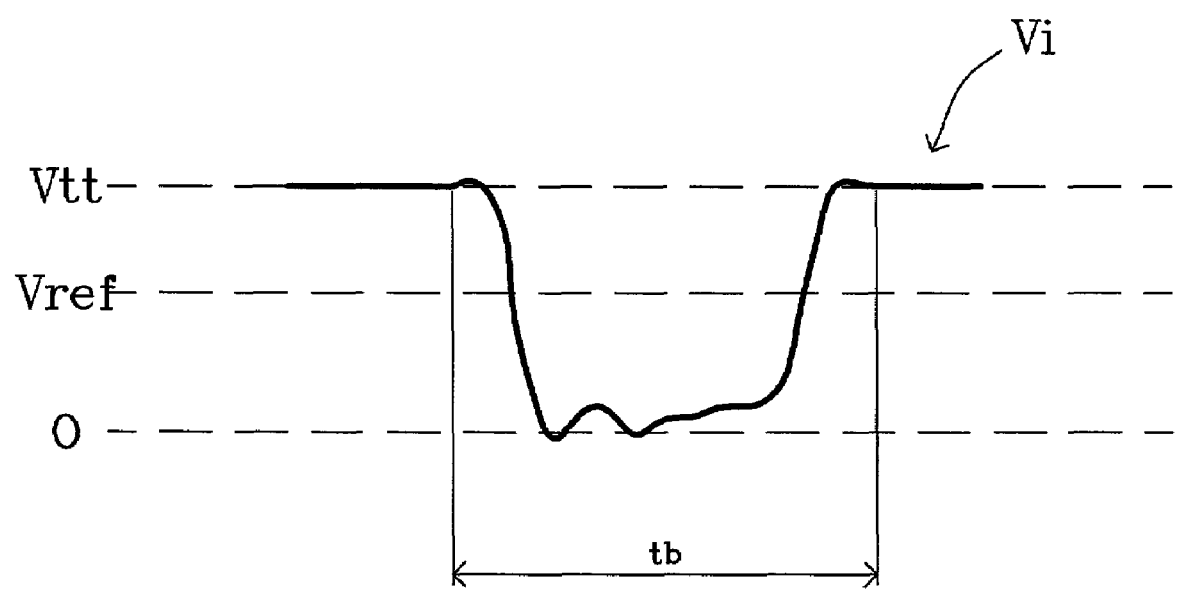
FIG. 7 is the wave diagram of the line signal after the ring-back constriction by this invention.

FIG. 7 is the wave diagram of the line signal Vi after the ring-back constriction in this invention. The ring-back is effectively constricted. The properly turn-off of the variable resistors saves power consumption. And the apparatus by this invention can be implemented in the chipset to reduce the number of the resistors needed outside the chipset.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus of ring-back constriction, coupled to a transmission line, for constricting a ring-back effect, the apparatus comprising:
    a comparator, coupled to the transmission line, for comparing a line signal on the transmission line with a reference voltage, and accordingly outputting a comparison signal;
    a termination controller, coupled to the comparator, for outputting a termination control signal according to the comparison signal;
    a termination variable resistor, coupled to a termination voltage and the transmission line, the resistance of the termination variable resistor being adjusted according to the termination control signal for providing a voltage to the transmission line;
    a constriction controller, coupled to the comparator, for outputting a constriction signal; and
    a transistor, having a gate and a source, the gate receiving the constriction signal, the transistor being coupled to a constriction voltage and the transmission line, the resistance of the transistor being adjusted according to the voltage difference between the gate and the source;
    wherein when the level of the line signal changes from a high voltage level to a low voltage level, the level of the constriction signal successively changes from a flint voltage level to a second voltage level to turn on the transistor, maintains the second voltage level for a delay period, and returns to the first voltage level;
    wherein after the level of the line signal changes from the high voltage level to the low voltage level, the transistor is turned on to provide the constriction voltage to the transmission line, so that the level of the transmission line is pulled up to reduce the undershot and thus the ring-back effect is constricted;
    wherein the constriction voltage is larger than the low voltage level.

2. The apparatus according to claim 1, wherein the constriction voltage is larger than the termination voltage.

3. The apparatus according to claim 1, wherein, when the line signal is at the high voltage level, the resistance of the termination variable resistor is of a low resistor value; and when the line signal transits from the high voltage level to a level lower than the reference voltage, the comparison signal transits to a low comparison-signal level, and ten the termination controller outputs the termination control signal according to the comparison signal to change the resistance of the termination variable resistor from the low resistor value to a high resistor value.

4. The apparatus according to claim 1, wherein, when the comparison signal transits from a high comparison-signal level to a low comparison-signal level, the resistance of the termination variable resistor begins to increase, and the resistance reaches a high resistor value after a transition period.

5. The apparatus according to claim 1, wherein, when the line signal is at the high voltage level, the resistance of the transistor is of a high resistance value; and when the line signal transits from the high voltage level to a voltage level lower than the reference voltage, the comparison signal transits to a low comparison-signal level accordingly, then the constriction controller outputs the constriction signal according to the comparison signal to adjust the resistance of the transistor to a low resistance value, and after the delay period, the resistance of the transistor transits from the low resistance value to the high resistance value.

6. The apparatus according to claim 5, wherein, when the comparison signal transits from a high comparison-signal level to the low comparison-signal level, the resistance of the transistor transits from the high resistance value to the low resistance value, and after the delay period, the resistance of the transistor begins to rise, and reaches the high resistance value after a transition period.

7. The apparatus according to claim 1, wherein, the termination controller comprises a weak transistor and the weak transistor takes a transition period to change the resistance of the termination variable resistor from a low resistor value to a high resistor value.

8. The apparatus according to claim 7, wherein the weak transistor is a PMOS transistor.

9. The apparatus according to claim 1, wherein the constriction controller comprises a weak transistor and the weak transistor takes a transition period to change the resistance of the transistor from a low resistance value to a high resistance value.

10. The apparatus according to claim 9, wherein the weak transistor is a PMOS transistor.

11. The apparatus according to claim 1, wherein the termination variable resistor comprises a PMOS transistor.

12. The apparatus according to claim 1, wherein the transistor comprises a PMOS transistor.

13. The apparatus according to claim 1, wherein the reference voltage is 1 volt.

14. The apparatus according to claim 1, wherein the termination voltage is 1.5 volt.

15. The apparatus according to claim 1, wherein the constriction voltage is higher than the termination voltage.

16. The apparatus according to claim 1, wherein the range of the constriction voltage is from 2.5 volt to 2.6 volt.

17. The apparatus according to claim 1, wherein the transmission line is in a GTL+ (Gunning Transistor Logic Plus) bus.

* * * * *